United States Patent
Ly

(10) Patent No.: US 8,948,992 B2
(45) Date of Patent: Feb. 3, 2015

(54) SYSTEM AND METHODS FOR LIMITING STANDING START ACCELERATION CONTROL USING DRIVER MONITORING SYSTEM (DRIVER ATTENTION MONITOR)

(71) Applicant: Toyota Motor Engineering & Manufacturing North America, Inc., Erlanger, KY (US)

(72) Inventor: Tai J. Ly, Los Angeles, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/915,717

(22) Filed: Jun. 12, 2013

(65) Prior Publication Data

US 2014/0372003 A1     Dec. 18, 2014

(51) Int. Cl.
*B60W 10/00*     (2006.01)
*B60K 31/00*     (2006.01)

(52) U.S. Cl.
CPC .................................... *B60K 31/00* (2013.01)
USPC ............................................ 701/70; 701/48

(58) Field of Classification Search
USPC .................................................... 701/70, 48
See application file for complete search history.

(56) References Cited

U.S. PATENT DOCUMENTS

| | | | |
|---|---|---|---|
| 5,521,580 A | 5/1996 | Kaneko et al. | |
| 6,021,370 A | 2/2000 | Bellinger et al. | |
| 6,496,117 B2 | 12/2002 | Gutta et al. | |
| 7,551,093 B2 | 6/2009 | Maass | |
| 2005/0038591 A1* | 2/2005 | Michi et al. | 701/96 |
| 2010/0030434 A1* | 2/2010 | Okabe et al. | 701/48 |

FOREIGN PATENT DOCUMENTS

| | | |
|---|---|---|
| JP | 2010076616 A | 4/2010 |
| JP | 2013056650 A | 3/2013 |

* cited by examiner

*Primary Examiner* — Mary Cheung
*Assistant Examiner* — Yuen Wong
(74) *Attorney, Agent, or Firm* — Gifford, Krass, Sprinkle, Anderson & Citkowski, P.C.

(57) ABSTRACT

The present invention includes a system for limiting the acceleration of a vehicle. The system is operable to determine when the driver of the vehicle is not paying attention and upon making this determination, the system limits the available acceleration of the vehicle. The system includes a vehicle power source, a driver input such as an accelerator pedal, and a driver attention monitor, all three of which are in communication with an electronic control unit.

10 Claims, 2 Drawing Sheets

SYSTEM AND METHODS FOR LIMITING STANDING START ACCELERATION CONTROL USING DRIVER MONITORING SYSTEM (DRIVER ATTENTION MONITOR)

FIELD OF THE INVENTION

The present invention relates to a system and method for controlling a vehicle, specifically a system and method which limits the acceleration of the vehicle based on a driver's input and level of attentiveness as determined by a driver attention monitor.

BACKGROUND OF THE INVENTION

Utilizing driver attention monitoring systems in vehicles has been known for quite some time. These systems can determine when a driver of a vehicle is paying attention to the road. For example, one such system utilizes a camera directed towards the driver's face. The system processes the image captured by the camera to determine what direction the driver is looking. For example, if the system determines that the driver is looking down or in another direction that is not the direction of the road, the system makes the determination that the driver is not paying attention.

These driver attention systems have been incorporated into vehicles utilizing a limited amount of other features in communication with the driver attention monitor. For example, some vehicles with driver attention monitors include an ability to send an audible warning over the vehicle's stereo system when it is determined that the driver is not paying attention. Other systems are coupled to the braking and acceleration system of the vehicle and are operable to decelerate or slow the rate of travel of the vehicle when the driver is not paying attention. Still other systems include tactile feedback to the driver such as a vibration of the driver's seat or the steering wheel.

In addition to cameras with image processing, driver attention monitors are also known to utilize inputs such as line of sight sensors, blood pressure sensors, temperature sensors, etc. in determining if the driver is aware of danger outside of the vehicle.

All of these systems in the prior art share a common problem in that their design and operation might provide a user experience which is less than desirable. As such, a new system and method is desired to increase the driver's overall driving experience.

SUMMARY OF THE INVENTION

The present invention includes a system for limiting the acceleration of a vehicle. The system is operable to determine when the driver of the vehicle is not paying attention and upon making this determination, the system limits the available acceleration of the vehicle. The system includes a vehicle power source, a driver input such as an accelerator pedal, and a driver attention monitor, all three of which are in communication with an electronic control unit.

The system starts operation when the driver inputs an acceleration request with the driver input. This driver input sends a driver acceleration request signal to the electronic control unit. The electronic control unit communicates with the driver attention monitor which determines if the driver is paying attention. When the driver is paying attention, the electronic control unit sends a vehicle acceleration request signal to the vehicle power source, the vehicle acceleration request signal corresponding to the driver acceleration request signal allowing the full amount of acceleration requested. If the driver is determined to not be paying attention, the electronic control unit alters the vehicle acceleration request signal to request a lower rate of acceleration from the vehicle power source than requested by the driver.

Numerous variations and customizations of this system and method can be included. For example, altering of the acceleration signal can be done to reduce the acceleration of the vehicle below a predetermined vehicle acceleration threshold. The predetermined vehicle acceleration threshold can be determined to be greater than zero. Also, altering the vehicle acceleration signal can occur when the driver acceleration request signal is above a predetermined driver acceleration request threshold. Additionally, the altering of the vehicle acceleration can occur only when the driver acceleration request signal changes by a predetermined minimum threshold change amount within a minimum amount of time.

The system and method can also include a speed sensor in communication with the electronic control unit wherein the altering of the vehicle acceleration signal only occurs when the value of the speed sensor is below a predetermined speed sensor threshold value.

The system can further include a driver alert mechanism in communication with the electronic control unit, the electronic control unit activating the driver alert mechanism when the vehicle acceleration signal is altered.

The method of operating the system of the present invention is as follows. After providing a vehicle with a vehicle power source, an electronic control unit, a driver input, and a driver attention monitor, a driver acceleration request signal is generated with the driver input. Additionally, a determination is made with the driver attention monitor as to if the driver is paying attention. Next, a vehicle acceleration request signal is sent to the vehicle power source, the vehicle acceleration request signal being based on the driver acceleration request signal, the vehicle acceleration signal being altered to reduce the vehicle acceleration when the driver is determined not to be paying attention.

This method can include further determinations such as determining if the driver acceleration request is above a predetermined driver acceleration request threshold and altering the vehicle acceleration request signal to reduce vehicle acceleration when the driver is determined not to be paying attention and the driver acceleration request signal is determined to be above the predetermined acceleration request threshold.

Yet another determination can be included in this method, the determination being one in which the acceleration is limited only when the vehicle is below a certain speed. For example, a speed sensor is provided within the system and the determination is made if the value of the speed sensor is less than a predetermined speed sensor threshold value. When this determination is made, the vehicle acceleration request signal is altered to reduce vehicle acceleration when the driver is determined not to be paying attention.

This determination can be utilized when the vehicle is in a congested traffic situation, for example to help control acceleration from a standing start when the driver is not paying attention. Having a predetermined speed sensor threshold value equal to or less than five miles per hour is ideal for congested traffic.

In addition, the method step of alerting the driver when the vehicle acceleration request signal is being altered can be included within the method. This is done by providing a driver alert mechanism in communication with the electronic control unit and the electronic control unit sending a signal to activate the driver alert mechanism when the vehicle acceleration signal is altered.

Various combinations of the above mentioned and discussed system and methods can be utilized depending on various application requirements. It is understood and appreciated that the invention may be practiced with some or all of the aforementioned additional system elements and method steps.

DETAILED DESCRIPTION OF THE PREFERRED EMBODIMENTS

Figure 1:
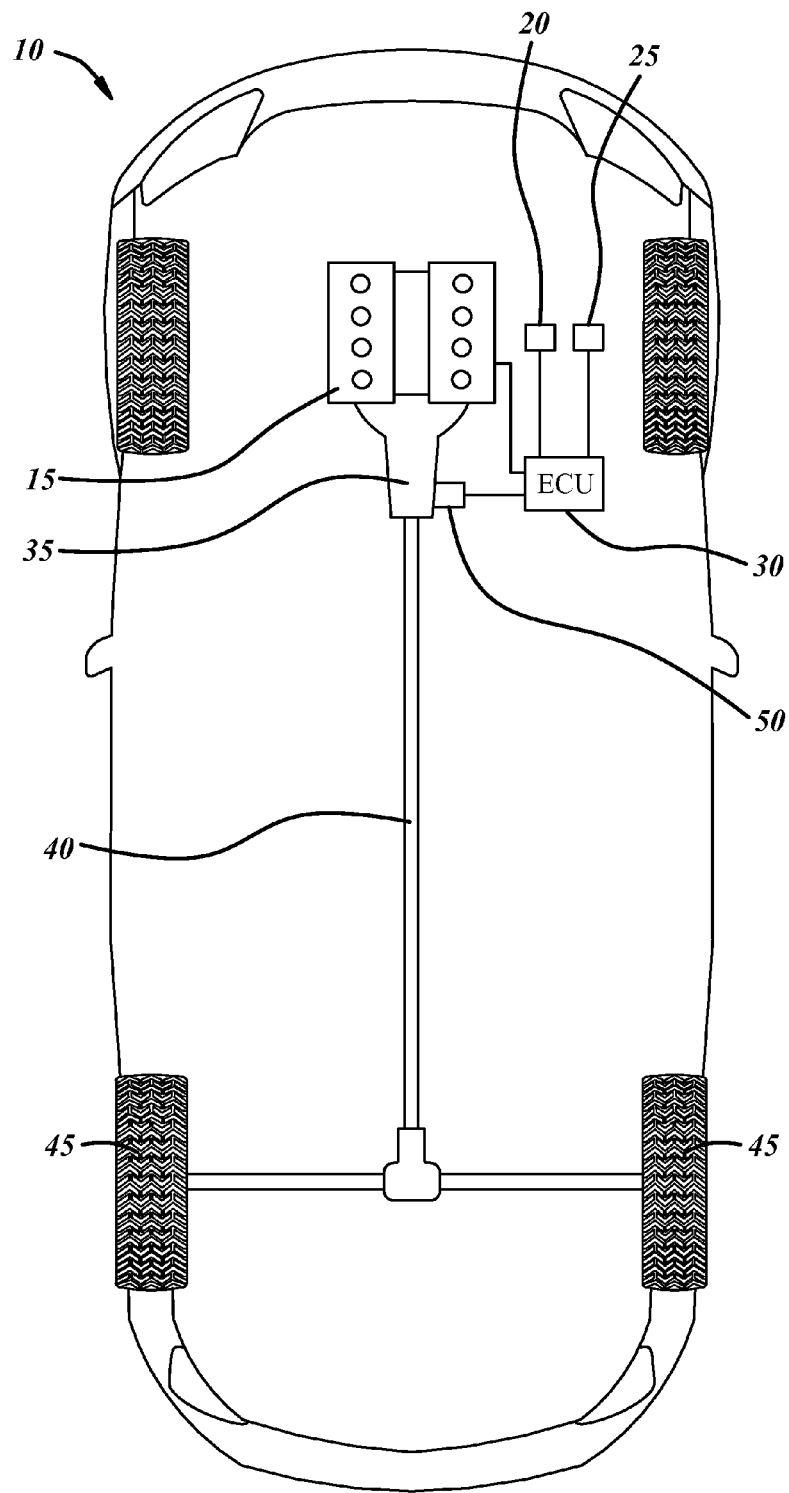
FIG. 1 is a diagrammatic view illustrating a preferred embodiment of the present invention.
Figure 3:
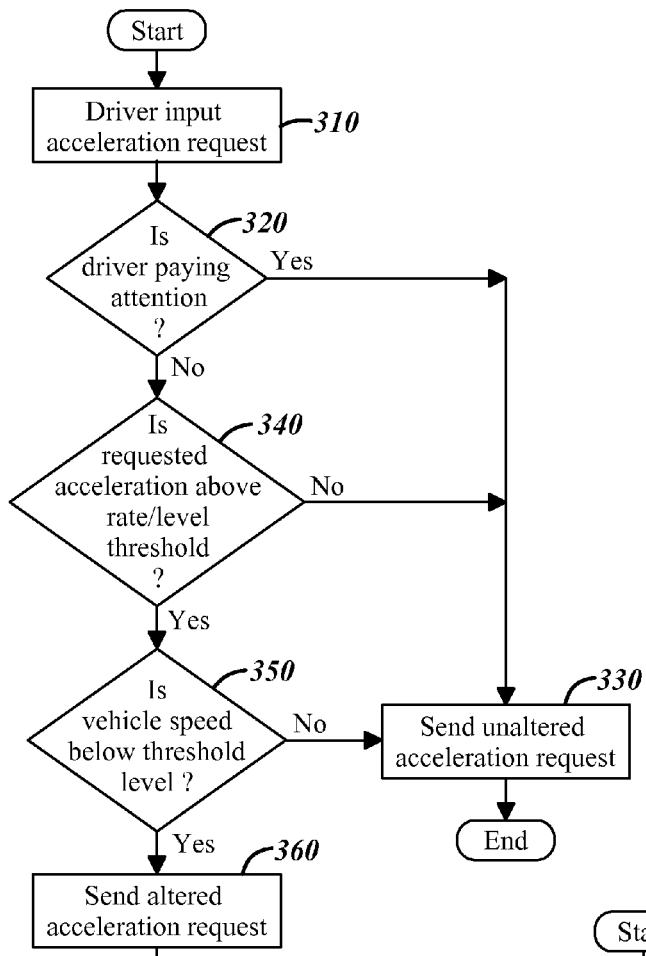
FIG. 3 is a flowchart illustrating the general operation of another embodiment of the present invention.
Figure 2:
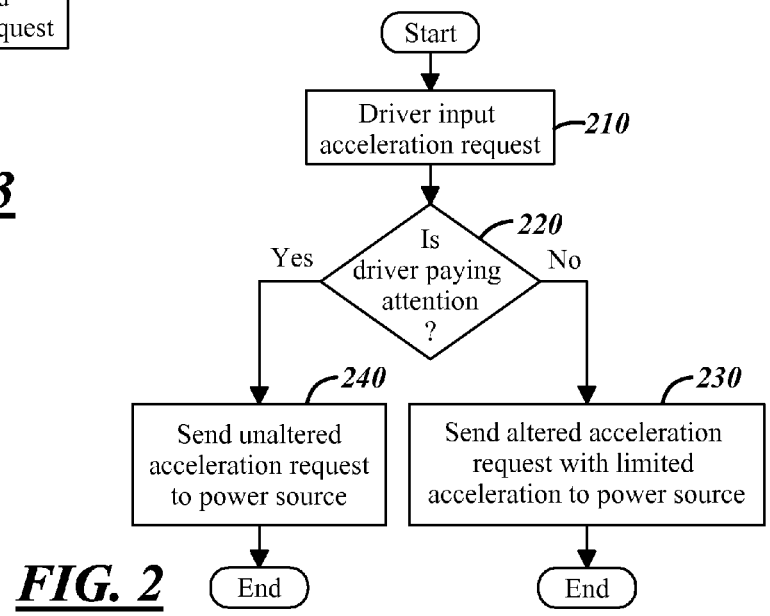
FIG. 2 is a flowchart illustrating the general operation of one embodiment of the present invention.

A system for limiting the acceleration of a vehicle 10 includes a vehicle power source 15, a driver input 20, a driver attention monitor 25, and an electronic control unit 30. The vehicle power source 15, driver input 20, and driver attention monitor 25 are all in communication with the electronic control unit 30.

The vehicle power source 15 can be a traditional internal combustion engine, an electric motor mounted into a traditional drive train system, one or more electric wheel hub motors, a hybrid power source system utilizing an internal combustion engine and an electric motor, or any other power source known to those skilled in the art capable of providing a motive force to a vehicle.

In the preferred embodiment the vehicle power source 15 is an internal combustion engine providing power through a transmission 35, down a driveshaft 40, and out to wheels 45 of the vehicle 10. It is understood and appreciated that while the preferred embodiment shown in FIG. 1 is a rear wheel drive power train system, the present invention could be practiced on any number of vehicle power train systems known to those skilled in the art such as front wheel drive, all wheel drive, etc.

The driver input 20 of the preferred embodiment is a traditional accelerator pedal. However, other driver inputs can be utilized such as steering wheel or dashboard mounted control buttons and switches or any other driver input known to those skilled in the art used by a driver of the vehicle to request additional acceleration from the vehicle.

The driver attention monitor 25 of the preferred embodiment includes a camera and imaging processor mounted in the instrument panel of the vehicle, the camera monitors the driver's face and the image processor determines what direction the driver is looking. It is understood and appreciated that this is but one type of driver attention monitor and any other driver attention monitor known to those skilled in the art can be utilized. For example, the camera could be mounted in various locations within the vehicle such as on the dashboard, along the upper edge of the windshield, etc., and other characteristics such as a line of sight sensor, blood pressure sensor, temperature sensor, etc. could be utilized by the driver attention monitor to help determine if the driver is paying attention.

In operation, the present invention sends a driver acceleration request signal from the driver input 20 to the electronic control unit 30. Then the driver provides input to the driver input 20, a driver acceleration request signal is sent to the electronic control unit 30. The electronic control unit 30 communicates with the driver attention monitor 25 and receives information on the determination of whether the driver is not paying attention. When the information received by the electronic control unit 30 from the driver attention monitor 25 indicates that the driver is not paying attention, the electronic control unit 30 sends an altered vehicle acceleration request signal to the vehicle power source 15 requesting a lower rate of acceleration than would be normally requested if the driver had been determined to be paying attention.

In the preferred embodiment the electronic control unit 30 alters the vehicle acceleration signal to a level below a predetermined vehicle acceleration threshold. For example, regardless of the level of the driver acceleration request signal as input from the driver input 20, the electronic control unit 30 alters the vehicle acceleration request signal when the driver is not paying attention to a level below 20% of available acceleration from the vehicle power source 15.

In the preferred embodiment, the predetermined vehicle acceleration threshold of the preferred embodiment is greater than zero. This enables acceleration while the driver is not paying attention; however, it also limits this acceleration while the driver is not paying attention.

In addition, in the preferred embodiment, the electronic control unit 30 alters the vehicle acceleration signal when the driver acceleration request signal is above a predetermined driver acceleration request threshold. For example, the vehicle acceleration request signal is altered when the driver is not paying attention, the predetermined driver acceleration threshold is 30%, and the driver input sends a driver acceleration request signal requesting 50% of available acceleration from the vehicle power source 15.

Yet another feature of the preferred embodiment is the electronic control unit 30 altering the vehicle acceleration request signal when the driver acceleration request signal changes by a predetermined minimum threshold change amount within a predetermined minimum amount of time. For example, if the driver is not paying attention and the driver requests with the driver input 20 a 30% or more increase in value of the driver acceleration request signal, such as from 20% to 50% or more, and this increase in acceleration takes place within a short amount of time, a quarter of a second for example, then the electronic control unit 30 will alter the vehicle acceleration request signal.

The preferred embodiment also includes a speed sensor 50. The speed sensor 50 of the preferred embodiment is mounted to the output of the transmission 35 and is operable to determine the speed of the vehicle. It is understood and appreciated that the speed sensor 50 could also be mounted in numerous other locations such as on the driveshaft 40, on the wheels 45, or any other location known to those skilled in the art enabling the speed of the vehicle to be determined.

The speed sensor 50 in the preferred embodiment is in communication with the electronic control unit 30, the electronic control unit 30 only altering the vehicle acceleration request signal when the value measured by the speed sensor 50 is below a predetermined speed sensor threshold value. For example, if the speed sensor determines that the vehicle is traveling at 5 miles an hour and the speed sensor threshold value is 20 miles an hour, then the electronic control unit 30 will alter the vehicle acceleration request signal when the driver is not paying attention. If the vehicle was determined to be traveling at 50 miles an hour by the speed sensor 50 and the speed sensor threshold value is 20 miles an hour, then the electronic control unit would not alter the vehicle acceleration request signal because the speed sensor value would be above the predetermined threshold amount.

The method of implementing the preferred embodiment is as follows. A vehicle with a vehicle power source 15, an electronic control unit 30, a driver input 20, and a driver attention monitor 25 is provided. The vehicle power source, driver input, and driver attention monitor all being in communication with the electronic control unit. The method starts with generating a driver acceleration request signal with the driver input 210 and determining if the driver is paying attention with the driver attention monitor 220. A vehicle acceleration request signal is then sent to the vehicle power source, this vehicle acceleration request signal being based on the driver acceleration request signal and being altered to reduce vehicle acceleration when the driver is determined not to be paying attention 230. The system sends a vehicle acceleration request signal to the power source without limiting acceleration if the driver is paying attention 240.

The preferred embodiment further includes additional determination steps. These determination steps begin with providing a vehicle with the power source 15, driver input 20, and driver attention monitor 25 all in communication with the provided electronic control unit 30 as discussed above. A driver acceleration request signal is generated and sent to the electronic control unit 30 310. A determination is made by the driver attention monitor 25 as to if the driver is paying attention 320. If the driver is paying attention, the electronic control unit 30 sends an unaltered vehicle acceleration request signal to the vehicle power source 15 330. If the driver is not paying attention, additional inquiry is made.

The system of the preferred embodiment determines if the driver acceleration request signal is above a predetermined driver acceleration request threshold 340. If the driver acceleration request is not above a predetermined driver acceleration request threshold, then the electronic control unit 30 sends an unaltered vehicle acceleration request signal to the vehicle power source 15 330. When the driver acceleration request signal is above the predetermined driver acceleration threshold, additional inquiry is made.

The system of the preferred embodiment determines if the value of the speed sensor 50 is less than a predetermined speed sensor threshold value 350. If the value of the speed sensor 50 is not less than a predetermined speed sensor threshold value, then the vehicle acceleration request signal is not altered and full acceleration is requested from the vehicle power source 15 330. If the value of the vehicle speed sensor 50 is less than a predetermined speed sensor threshold value, then the vehicle acceleration request signal is altered to request a lower acceleration from the vehicle power source than initially input by the driver acceleration request signal 360.

The foregoing description is illustrative of particular embodiments of the invention but is not meant to be a limitation upon the practice thereof. The following claims including all equivalents thereof are intended to define the scope of the invention.

The invention claimed is:

1. A system for limiting the acceleration of a vehicle comprising:
   an electronic control unit;
   a vehicle power source in communication with the electronic control unit;
   a driver input in communication with the electronic control unit; and
   a driver attention monitor in communication with the electronic control unit;
   wherein the driver input sends a driver acceleration request signal to the electronic control unit, and the electronic control unit sends a vehicle acceleration request signal to the vehicle power source based on the driver acceleration request signal and information from the driver attention monitor,
   wherein the electronic control unit alters the vehicle acceleration request signal to reduce acceleration of the vehicle below a predetermined vehicle acceleration threshold when a driver of the vehicle is not paying attention as determined by the driver attention monitor and when the driver acceleration request signal changes by a predetermined minimum threshold change amount within a predetermined minimum amount of time.

2. The system of claim 1, wherein the electronic control unit alters the vehicle acceleration signal when the driver acceleration request signal is above a predetermined driver acceleration request threshold.

3. The system of claim 1 further comprising:
   a speed sensor in communication with the electronic control unit, wherein the electronic control unit alters the vehicle acceleration signal when the value of the speed sensor is below a predetermined speed sensor value threshold.

4. The system of claim 3 wherein, the speed sensor value threshold is less than or equal to five miles per hour.

5. The system of claim 1, wherein the predetermined vehicle acceleration threshold is greater than zero.

6. The system of claim 1, further comprising:
   a driver alert mechanism, the driver alert mechanism is in communication with the electronic control unit, the electronic control unit activates the driver alert mechanism when the vehicle acceleration request signal is altered.

7. A method of limiting acceleration of a vehicle comprising:
   providing a vehicle with a vehicle power source, an electronic control unit, a driver input and a driver attention monitor, the vehicle power source, the driver input, and the driver attention monitor are in communication with the electronic control unit;
   generating a driver acceleration request signal with the driver input;
   determining if a driver is paying attention with the driver attention monitor;
   determining if the driver acceleration request signal is above a predetermined driver acceleration request threshold;
   sending, by the electronic control unit, a vehicle acceleration request signal to the vehicle power source, the vehicle acceleration request signal being based on the driver acceleration request signal; and
   altering, by the electronic control unit, the vehicle acceleration request signal to reduce vehicle acceleration when the driver is determined, by the driver attention monitor, not to be paying attention and when the driver acceleration request signal is determined to be above the predetermined driver acceleration request threshold.

8. The method of claim 7 further comprising:
   providing a speed sensor in communication with the electronic control unit;
   determining if the value of a speed sensor is less than a predetermined speed sensor threshold value; and
   altering, by the electronic control unit, the vehicle acceleration request signal to reduce vehicle acceleration when the driver is determined, by the driver attention monitor, not to be paying attention, the driver acceleration request signal is determined to be above the predetermined driver acceleration request threshold, and the value of the speed sensor is less than a predetermined speed sensor threshold value.

9. The method of claim 8 further comprising:
providing a driver alert mechanism in communication with the electronic control unit; and
sending a signal to activate the driver alert mechanism when the vehicle acceleration request signal is altered.

10. A system for limiting the acceleration of a vehicle comprising:
an electronic control unit;
a vehicle power source in communication with the electronic control unit;
a driver input in communication with the electronic control unit;
a driver attention monitor in communication with the electronic control unit;
wherein the driver input sends a driver acceleration request signal to the electronic control unit, and the electronic control unit sends a vehicle acceleration request signal to the vehicle power source based on the driver acceleration request signal and information from the driver attention monitor;
wherein the electronic control unit alters the vehicle acceleration request signal to reduce acceleration when a driver of the vehicle is not paying attention as determined by the driver attention monitor and when the driver acceleration request signal is above a predetermined driver acceleration request threshold within a predetermined minimum amount of time.

* * * * *